United States Patent
Saxer et al.

(10) Patent No.: US 6,749,387 B1
(45) Date of Patent: Jun. 15, 2004

(54) INDUSTRIAL TRUCK

(76) Inventors: Robert Saxer, Dorfstrasse 20, D-85307, Paunzhausen (DE); Wilhelm Schinkinger, Rudolf-von-Hirsch-Strasse 3a, D-82152, Krailling (DE)

(*) Notice: Subject to any disclaimer, the term of this patent is extended or adjusted under 35 U.S.C. 154(b) by 0 days.

(21) Appl. No.: 09/926,722
(22) PCT Filed: Jun. 7, 1999
(86) PCT No.: PCT/EP99/03916
§ 371 (c)(1), (2), (4) Date: Mar. 15, 2002
(87) PCT Pub. No.: WO00/75058
PCT Pub. Date: Dec. 14, 2000

(51) Int. Cl.⁷ ............................................... B65G 61/00
(52) U.S. Cl. ..................... 414/458; 414/495; 414/662
(58) Field of Search ................. 414/458, 467, 414/495, 539, 662, 663

(56) References Cited

U.S. PATENT DOCUMENTS

| | | | | |
|---|---|---|---|---|
| 2,170,607 A | * | 8/1939 | Green ........................ 414/428 |
| 3,861,535 A | | 1/1975 | Huxley, III et al. |
| 4,101,040 A | | 7/1978 | Stolley |
| 4,183,710 A | * | 1/1980 | Burdick ...................... 414/458 |
| 4,925,357 A | * | 5/1990 | Cisternino et al. .......... 414/495 |
| 5,655,733 A | * | 8/1997 | Roach ......................... 414/458 |
| 5,879,122 A | * | 3/1999 | Voelzke ....................... 414/458 |
| 6,019,565 A | * | 2/2000 | Gesuale ....................... 414/458 |

FOREIGN PATENT DOCUMENTS

| | | | | |
|---|---|---|---|---|
| DE | 2535495 A1 | * | 7/1976 | ................. 414/458 |
| EP | 0 045 553 | | 2/1982 | |
| RU | 0576993 | * | 10/1977 | ................. 414/458 |

* cited by examiner

Primary Examiner—Eileen D. Lillis
Assistant Examiner—Thuy V. Tran
(74) Attorney, Agent, or Firm—Oblon, Spivak, McClelland, Maier & Neustadt, P.C.

(57) ABSTRACT

An industrial truck for handling pallets. The truck includes a drive unit and a load unit. The load unit includes two load-receiving arms that receive the pallet and that are oriented in the direction of motion of the truck, i.e., in a longitudinal direction of the industrial truck. The load-receiving arms, when viewed from the direction of motion of the truck, are provided on different sides of the pallet to be picked up and include a plurality of pallet pick-ups that are spaced apart in the direction of motion of the truck and that are engaged or disengaged with the pallet by a transversal motion with respect to the direction of motion of the truck.

19 Claims, 7 Drawing Sheets

INDUSTRIAL TRUCK

TECHNICAL FIELD

The invention relates, in general, to an industrial truck with a drive part and a load part for handling packed or empty pallets, in accordance with the preamble of Claim 1 and, in particular, to an industrial truck for handling pallets of a certain format, such as those used in the commissioning sector and in the transport of piece goods.

STATE OF THE ART

Such an industrial truck is known from U.S. Pat. No. 4,101,040. The load part has two load arms in the form of fork prongs that are oriented in the travel direction, i.e. the longitudinal direction of the industrial truck, and can be raised vertically, with which loads such as pallets or goods packed on pallets can be handled. The term "handling" includes activities such as picking up, transporting, and setting down a pallet, goods packed on a pallet, or a stack of pallets. Other examples of such industrial trucks are conventional manual forklifts, electric forklifts, wheel-supported stackers, counterweight stackers, or reach mast trucks. In order to pick up a pallet or goods packed on a pallet, the pallet is particularly provided with suitable recesses for engagement of the fork prongs of the industrial truck, for example of a stacker.

In the transport of piece goods, and in the commissioning sector of commercial facilities, the pallets used are predominantly pallets made of wood, with a certain format, particularly so-called euro-pallets with a length of 1200 mm, a width of 800 mm, a height of 150 mm, and a weight of about 20 to 30 kg. In such facilities, quite a large number of empty pallets that are not needed are often left behind on the floor after roll-out cycles have been completed, and until now, these had to be stacked, either manually or using one of the aforementioned commercially available industrial trucks, to form pallet stacks of 15 to 17 pallets, for example (corresponding to the inside height of a transport truck), that could be transported and loaded. Making such a stack by hand involves a high level of physical effort. For this reason, the empty pallets are usually handled with one of the aforementioned industrial trucks.

However, the use of conventional industrial trucks for handling empty pallets proves to be extremely inefficient, since the activities that are involved in this task can only be performed with a high level of time expenditure, and therefore result in high personnel costs. In order to stack several empty pallets that are lying around on the floor into a pallet stack, for example, using one of the aforementioned industrial trucks, first the truck is driven towards a first empty pallet and the fork prongs of the industrial truck are placed under the first pallet. Subsequently, the first pallet is raised to a certain height, by means of a vertical movement of the fork prongs. In this condition, the industrial truck is driven towards a second pallet, specifically in such a way that the first pallet is essentially aligned with the second pallet. Then the first pallet is set down on the second pallet. At this point in time, the fork prongs are still engaged with the first pallet. In order to place a third pallet onto the pallet stack that now consists of the first and the second pallet, or to place this pallet stack onto a third pallet, the industrial truck must therefore first be put into motion in such a way that the fork moves out of the first pallet. Subsequently, the fork is lowered. Now the second pallet that is located on the floor, or the third pallet, can be approached and lifted. Subsequently, the stated steps can be repeated.

Without discussing the matter further, it is evident that stacking a pallet stack that consists of 15 to 17 empty pallets, for example, requires a constant back and forth movement of the industrial truck, particularly because of the fork prongs that project in the direction of travel, i.e. the longitudinal direction, in order to move the fork from a pallet in a higher position into a pallet in a lower position, or vice versa. This is very time-consuming and is accordingly connected with high personnel costs. The same holds true for unstacking empty pallets that have already been stacked together to form a stack, which fundamentally takes place in the reverse sequence as stacking the empty pallets.

In order to guarantee problem-free handling during pallet storage in a high-shelf facility or in automatic pallet packing, the pallets furthermore are not allowed to demonstrate any damage, such as pieces splintered off, missing wooden parts, etc., since the damaged pallets cannot be transported, or can be transported only with restrictions, and might no longer be suitable for use in a high-shelf facility, because they might no longer meet the static requirements. Severely damaged pallets can therefore no longer be used. In order to keep the acquisition costs for new pallets low, a high level of pallet quality is therefore considered to be very important. For this reason, a person who is entrusted with the operation of conventional industrial trucks or, in general, with the handling of empty pallets, requires a certain amount of practice in order not to damage the pallets with the fork of a stacker while bringing the fork into place, and in order to accomplish the task to be performed within a reasonable amount of time.

Furthermore, in order for a pallet stack made up of 15 to 17 empty pallets to possess the necessary stability to prevent it from tipping to the side, and to allow it to be temporarily stored or loaded onto a transport truck to take up as little space as possible, the pallet on the top of the pallet stack, in each instance, must be precisely aligned with the pallet under it, in each instance. This again presupposes a certain level of experience in the operation of the industrial truck. The number of persons who are able to assure safe handling of pallets, using conventional industrial trucks, is therefore limited to specially trained personnel.

Other industrial trucks are known from the European Patent Application No. EP 0 045 553 A1 and the U.S. Pat. No. 3,861,535. EP 0 045 553 A1 particularly describes a device for handling several boxes arranged in a row, or several stacks of boxes arranged in a row, using two clamping plates that are arranged opposite one another and can be moved horizontally towards one another. U.S. Pat. No. 3,861,535 discloses a forklift truck with a forklift mechanism and a carrying device, which holds pallets or pallet boxes that have been picked up by the forklift mechanism and raised to a certain height at this certain height.

Presentation of the Invention

Proceeding from an industrial truck as known from U.S. Pat. No. 4,101,040, the invention has the task of creating an industrial truck designed for simple and efficient handling, particularly of pallets with a certain format, which also allows picking up and transporting loads packed on a pallet.

This task is accomplished by means of the industrial truck in accordance with the characteristics of Claim 1.

The industrial truck according to the invention particularly demonstrates a drive part and a load part, as is the case for a conventional industrial truck. The load part comprises two load arms, oriented in the longitudinal direction of the industrial truck, to hold a pallet that can be packed or empty.

In conventional industrial trucks, as indicated initially, the load arms are usually structured as fork prongs, which are brought into engagement with recesses provided in the pallet, by means of a forward movement of the industrial truck, forming a positive lock. The load arms are therefore arranged in accordance with the distance between the recesses, i.e. at a distance that is less than the dimension of the pallet to be picked up, in the crosswise direction of the industrial truck. In contrast to this, the load arms of the industrial truck according to the invention are arranged on different sides of the pallet to be picked up, in each instance, viewed in the direction of travel, i.e. the longitudinal direction of the industrial truck, in other words at a distance that is greater, in the crosswise direction, than the dimension of the pallet to be picked up, and they each have a plurality of pallet holders spaced apart in the longitudinal direction, which can be aligned towards the pallet, which can be brought into or out of engagement with the pallet, in particular with the recesses provided on the pallet, by means of a movement perpendicular to the longitudinal direction. This movement perpendicular to the longitudinal direction can take place exclusively by means of a movement of the load arms. Likewise, however, a movement of the pallet holders provided on the load arms, or a combined movement of the load arms and the pallet holders is possible. Furthermore, the movement of the pallet holders can consist of a purely horizontal movement and a purely vertical movement that takes place, in each instance, perpendicular to the direction of travel, i.e. the longitudinal direction of the industrial truck. However, the movement of the pallet holders can also be achieved by means of a circular movement of the pallet holders, which can be broken down into a horizontal component and a vertical component perpendicular to the longitudinal direction.

Since picking up the pallet, viewed in the direction of travel, i.e. the longitudinal direction of the industrial truck, takes place by means of engagement on both sides of the pallet, it is advantageous that the engagement lengths of the pallet holders, which can be structured as fork prongs, as in the case of conventional industrial trucks, can be significantly reduced. In conventional industrial trucks, the fork prongs must be at least long enough so that they extend beyond the center of gravity of the pallet to be picked up, so that the pallet does not tip over forwards when it is lifted from the floor. This relatively long length of the fork prongs increases the risk of damaging the pallet while the fork prongs pass under it. However, this risk is significantly reduced by the industrial truck according to the invention.

Since the pallet holders can be brought into and out of engagement with the pallet by means of a movement perpendicular to the direction of travel, i.e. the longitudinal direction of the industrial truck, the pallet holders can be implemented in the vertical direction of the industrial truck, without a constant back and forth movement of the truck. This contributes to significantly faster and easier handling of the pallets, i.e. it allows the formation of a pallet stack or pallet-by-pallet removal of an existing pallet stack in a relatively short period of time. Therefore the industrial truck according to the invention allows efficient handling, particularly of empty pallets.

As explained above, the time expenditure in connection with the activities involved in the handling of empty pallets can be significantly reduced by means of the industrial truck according to the invention. This in turn means a significant savings in personnel and personnel costs. Therefore a shipper of piece goods that has to handle a daily turnover of approximately 300 to 400 empty pallets and more can guarantee better working conditions.

Furthermore, since components of conventional industrial trucks can be used to a great extent, the production costs or acquisition costs for the industrial truck according to the invention are not higher than those for a conventional electric pole-arm forklift truck ("ant").

The industrial truck according to the invention can therefore be implemented as a stand-alone device or in the form of a special attachment for a wheel-supported stacker, counterweight stacker, or reach mast truck.

Although the industrial truck according to the invention is specifically designed for handling empty pallets of a certain format, particularly so-called euro-pallets, it can fundamentally also be used for transporting any desired kind of pallet, a load packed on a pallet, or a stack of pallets.

Further developments and embodiments according to the invention are the object of the dependent claims.

In order to be able to pick up and lift an empty pallet that is lying on the floor, the load arms have to be adjustable, depending on the format of the pallet to bepicked up, both with regard to a certain distance from the floor and with regard to a certain distance from one another. In order not to limit the use of the industrial truck according to the invention to a certain pallet format, it is therefore advantageous if the load arms that hold the pallet holders are adjustable horizontally and vertically.

Irregardless, the load arms can be provided on a load carriage that can be moved vertically, as in the case of a counterweight stacker, a wheel-supported stacker, or a reach mast truck, which carriage can be moved up and down along a reach mast that is assigned to the load part or, as in the case of a forklift truck, an electric manual lift truck, or an electric pole-arm forklift truck, they can form wheel arms of the load part, which are supported on the floor by way of load rollers, where the load part can be raised, relative to the drive part, pneumatically, hydraulically, or mechanically. Furthermore, the load arms can be adjustable in the crosswise direction of the industrial truck. These measures make a significant contribution to great flexibility and therefore to a broad spectrum in the area of application of the industrial truck according to the invention.

In order to keep the risk of damage as low as possible when picking up the pallets, the pallet holders furthermore preferably have a rotation-mounted contact roller at their end facing the pallet, which contacts the pallet when the pallet holder is engaged with it. A relative movement between the pallet holders and the pallets therefore takes place by means of a roll-off movement of the pallet holder on the pallet. As a result, the friction forces that occur during a relative movement are significantly reduced, on the one hand; on the other hand, the likelihood of damage caused by a thrust impact is reduced, as compared with sharp fork prongs.

Such damage can be restricted even more if at least the outside circumference region of the contact roller is made of an elastic and therefore impact-absorbing material. Another advantage of this structure of the contact roller, particularly in the case of a heavy pallet stack that consists of a large number of pallets, is that the contact surface of the bottommost pallet, which rests directly on the contact rollers, is increased relative to the pallet material, because of the resilience of the elastic material, which means that the contact roller presses into the pallet material to a lesser degree.

In order to allow problem-free handling of the pallets, even by a group of persons with less skill, it is furthermore advantageous if the industrial truck according to the invention has a feed device that makes it possible to guide and place an empty pallet that is lying on the floor, for example, between the two load arms with the pallet holders, while the industrial truck is in travel mode, by simply "running over" the pallet to be picked up with the industrial truck, i.e. collecting it. In this regard, it is particularly advantageous if this feed device extends beyond the load part and the drive part of the industrial truck according to the invention, which means that collecting a pallet that is lying on the floor, for example, is not limited to forward travel of the industrial truck, but rather is also possible during reverse travel.

This feed device preferably comprises guide rails assigned to the load arms, which are aligned in the longitudinal direction of the industrial truck, where the distance between them, viewed in the direction of travel of the industrial truck, increases towards the front and rear of the industrial truck. With this feed device, pallets that are lying around on the floor can simply be "run over", i.e. collected. The guide rails, in turn, can have a plurality of guide rollers arranged at a distance from one another in the direction of travel, i.e. the longitudinal direction of the industrial truck, which minimize the friction forces that occur between the guide rails of the feed device and the pallets when the pallets are run over and collected.

Another simplification in the collection of pallets results if the feed device has a locking device, preferably provided on the guide rails, which makes it possible to releasably lock the pallet to be picked up in place in a predetermined holding position between the two load arms. In this case, the industrial truck does not have to be stopped after it runs over a pallet, in order to pick it up, i.e. to take hold of it and lift it. Instead, the pallet to be picked up is pushed along in the travel direction of the industrial truck for a short distance, until it is removed from the floor, since it is held in place in a predetermined holding position between the load arms. By means of a corresponding adjustment of the speed of travel of the industrial truck, to a speed at which the pallet is picked up, i.e. taken hold of and lifted, by the two load arms, in this case the distance over which the pallet is pushed while it is lying on the floor can be minimized.

If, in addition to the locking device, a pick-up position sensor is also provided, which detects whether or not the pallet has taken the predetermined holding position, and indicates this by giving off a corresponding electrical signal, the operator of the industrial truck can effect pick-up of the pallet as a function of the electrical signal, by means of activating the load arms and/or the control device that is coupled with the holding position sensor. Of course, it is advantageous, in this regard, if the control device automatically activates the load arms and/or the pallet holders as a function of the electrical signal, since in this case the operator of the industrial truck only has to pay attention to running over the pallets to be collected with the shortest possible path. Pallet-by-pallet distribution of the pallets already stacked in a stack on the floor is also particularly simple when using the control device.

A preferred embodiment of the industrial truck according to the invention consists of the fact that the load arms each comprise a rotation-mounted roller, the axis of rotation of which is aligned in the longitudinal direction, i.e. are structured in roller form, where the pallet holders preferably extend tangentially over the outside circumference of the roller, in each instance. By means of a synchronous, opposite rotational movement of the two rollers in a direction of rotation that is determined, in each instance, the pallet holders can be brought into engagement with the pallet to be picked up, in such a way that the pallet which is being picked up is already lifted to a specific height simply by the further rotational movement of the rollers. A further rotational movement of the load arms would have the result that the pallet holder goes out of engagement with the lifted pallet, which would cause it to fall to the floor.

Once the pallet holders have been brought into engagement with the pallet, however, lifting the pallet could also be brought about by a vertical movement of the load arms, i.e. lifting of the pallet could be achieved by means of a rotational movement of the load arms in combination with a vertical movement. Of course, the rollers must be positioned in such a way, relative to the floor and the pallet to be picked up, i.e. they must be adjusted by means of a horizontal and vertical adjustment of the load arms and/or the pallet holders perpendicular to the direction of travel, i.e. the longitudinal direction, so that when a rotational movement of the rollers occurs, the pallet holders do not touch the floor, on the one hand, and they can be brought into and out of engagement with the pallet to be picked up, on the other hand. In this connection, the diameter of the circle described by the ends of the pallet holders, in each instance, during a rotational movement of the rollers, must also be coordinated with the pallet format in each instance.

With regard to the most efficient handling of empty pallets that is possible, particularly with regard to unstacking an existing pallet stack, it is advantageous if the rollers each have a plurality of pallet holders spaced uniformly apart in the circumference direction of the rollers. In this case, but of course only if the rollers and/or the pallet holders are appropriately coordinated with the distance from the floor and the pallet format of the pallets to be picked up, a pallet stack can be formed from any desired number of pallets, or an existing pallet stack can be unstacked, within a relatively short period of time, by means of a synchronous, opposite rotational movement of the rollers in the direction of rotation determined in each instance.

Forming a pallet stack by means of the industrial truck according to the invention can be implemented, for example, in that individual empty pallets that are lying around on the floor are "run over" by the industrial truck according to the invention, in at such a way that they are placed between the two load arms by the feed device described above. After the predetermined holding position between the two load arms of the industrial truck has been reached, in which the pallet that has been collected is held in place by the locking device, specifically even if travel continues, which position is detected by the holding position sensor, the rollers are activated, preferably automatically, to put them into a suitable rotational movement. In this connection, the pallet holders engage into the collected pallet and take the pallet with them, in an upward direction, during the course of the further rotational movement of the rollers. As soon as this pallet has reached a height that is sufficient to place another pallet under the pallet that has been lifted, the rotational movement of the roller is stopped. Immediately after this procedure, the next pallet can be run over and collected. Only after it has been detected, once again, that the collected pallet has been placed in the predetermined holding position between the two load arms, the load arms are put into a rotational movement in the opposite direction, causing the first pallet to be set down on the collected pallet underneath it. Unhindered movement of the rollers in the opposite direction of rotation is only possible, however, once the pallet holders have come out of engagement with the pallet in the higher position, viewed in the crosswise direction. For this purpose, the pallet holders must be able to perform a horizontal movement perpendicular to the longitudinal direction, by means of which they are moved away from the pallet. This can be achieved in that they are coupled with the roller, in each instance, in wing like manner, in such a way that they assume the aforementioned tangential position under the effect of a bias force, and can be pivoted into a circumference position, counter to the bias force, in which they are essentially aligned in the circumference direction of the roller. The horizontal movement of the pallet holders could also be achieved, in general, however, if the pallet holders are rigidly attached to the load arms and the load arms are adjusted horizontally, perpendicular to the longitudinal direction.

The wing-like coupling of the pallet holders with the load arms is also particularly advantageous for unstacking empty pallets that have already been formed into a stack. For unstacking, the industrial truck according to the invention first picks up a stack of empty pallets, in that it activates the rollers in such a way that the pallet holders are brought into engagement with the bottom-most pallet of the pallet stack, by means of a rotational movement of the rollers in a certain direction of rotation, in each instance, and the pallet stack is lifted. After transport of the pallet stack to a desired location, the rollers are activated in such a way that they perform a rotational movement in the opposite direction of rotation, causing the entire pallet stack to first be set down on the floor. The rotational movement of the rollers is then continued until the pallet holders or, in the case of several pallet holders distributed over the circumference of the rollers, the next pallet holders, engage with the pallet lying in the second row, viewed from the floor up. Since the pallet holders are coupled with the roller, as described above, they can pivot towards the roller and glide along the pallet stack under the pallet that is lying in the second row, if they hit against the pallet stack from the top, in each instance, during this continued rotational movement of the rollers. If the pallet holders are rigidly attached to the rollers, the load arms and/or the pallet holders must, of course, perform a horizontal movement perpendicular to the longitudinal direction. Now the rollers are activated again, in such a way that they perform a rotational movement in the first direction of rotation, in order to lift the pallet stack, starting from the second pallet, viewed from the floor up, thereby releasing the bottom-most pallet and making it possible to leave it behind.

Forming a pallet stack, or unstacking individual pallets from an existing pallet stack, could also be implemented in a different way, however. For example, the load arms could have a plurality of transport devices spaced apart in the longitudinal direction and aligned vertically, in each instance, with a transport means, such as a conveyor belt or a conveyor chain, on which the pallet holders are attached, in each instance. In this case, the transport means, in each instance, can be controlled to be synchronous in opposite directions. The pallet holders are aligned towards the pallet, preferably normally, on the transport means in each instance. Here again, it would be advantageous if the transport means each have a plurality of pallet holders, spaced uniformly apart in the direction of movement of the transport means, in each instance, and/or the pallet holders are coupled with the transport means, in each instance, in wing-like manner, as in the case of the roller, in such a manner that they assume the normal position under the effect of a bias force, and can be pivoted into a parallel position counter to the bias force, in which position they are essentially aligned parallel to the transport means.

The industrial truck according to the invention is particularly designed for handling empty pallets of a specific format, for example so-called euro-pallets. Therefore the industrial truck preferably has a holding device adapted to the format of the pallets, which is placed above the load arms and makes guided pick-up of empty pallets in the vertical direction of the industrial truck possible. On the one hand, this eliminates the risk of tipping of a pallet stack formed of several pallets. On the other hand, precise alignment of the pallets above one another is made possible.

In an advantageous further development, the holding device comprises a locking device, for example one or more spring-biased pivot hooks, which allow(s) releasable locking of the empty pallet(s) held in the guide basket at a certain height. This further development facilitates both the formation and the unstacking of a pallet stack, since it creates the possibility of holding the pallet stack in place, starting from any desired pallet, for example the second pallet from the bottom, by way of the locking device, while the bottom-most pallet can be set down on the floor, by means of the engagement of the pallet holders and appropriate control of the load arms. Subsequently, the pallet stack being held in place by the locking device can be taken over by the load arms again and the procedure described above can be initiated once again.

PREFERRED EMBODIMENT OF THE INVENTION

The preferred embodiment of the industrial truck 1 according to the invention will be described below, making reference to FIGS. 1 to 6.

Figure 1:
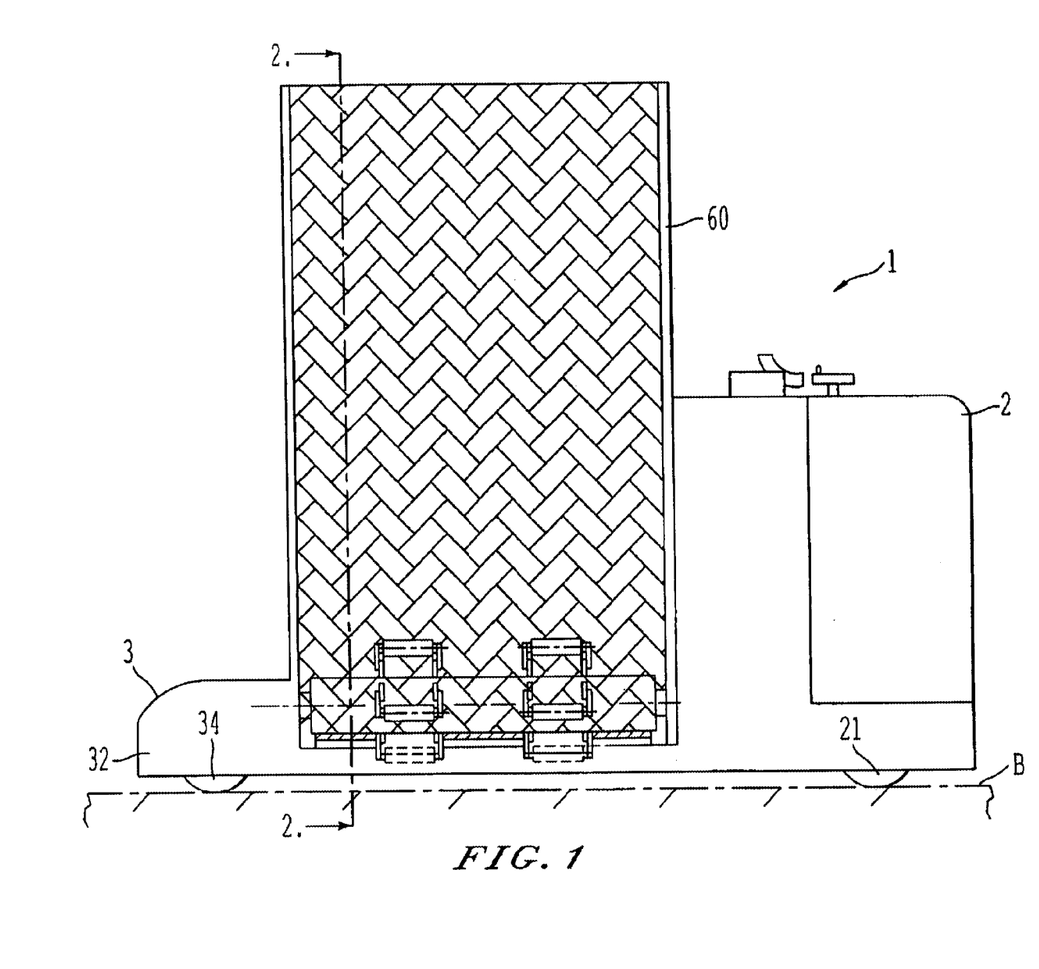
FIG. 1 shows a schematic side view of a preferred embodiment of the industrial truck according to the invention.

As is shown in FIG. 1, for example, the industrial truck 1 according to the invention, which is similar to an electric forklift truck, comprises a drive part 2 and a load part 3. In the region of the drive part 2, the industrial truck 1 stands on the floor, with a steerable drive wheel 21 and a pivot roller (not shown).

A battery compartment (not shown) to provide power to an electric motor (not shown) that drives the truck, as well as an electric roller drive engine (not shown), are housed in the drive part 2. Furthermore, the drive part 2 comprises a control console 22 with a pivoting operating level 23 for forward and reverse travel, a steering wheel 24, an on/off switch 25, a battery level indicator 26, as well as several switches and indicator lights 27 to indicate the functions being performed by the industrial truck 1, the control and drive modi with regard to travel drive, roller drive, and the like. On the side of the drive part 2 that faces away from the load part 3, there is a platform 29, on which the person operating the industrial truck sits or stands, preferably perpendicular to the direction of travel, i.e. the longitudinal direction L of the industrial truck. Finally, a foot-activated safety switch 28 is provided on the platform 29, which does not allow operation of the industrial truck until it is activated by the operator.

Figure 4:
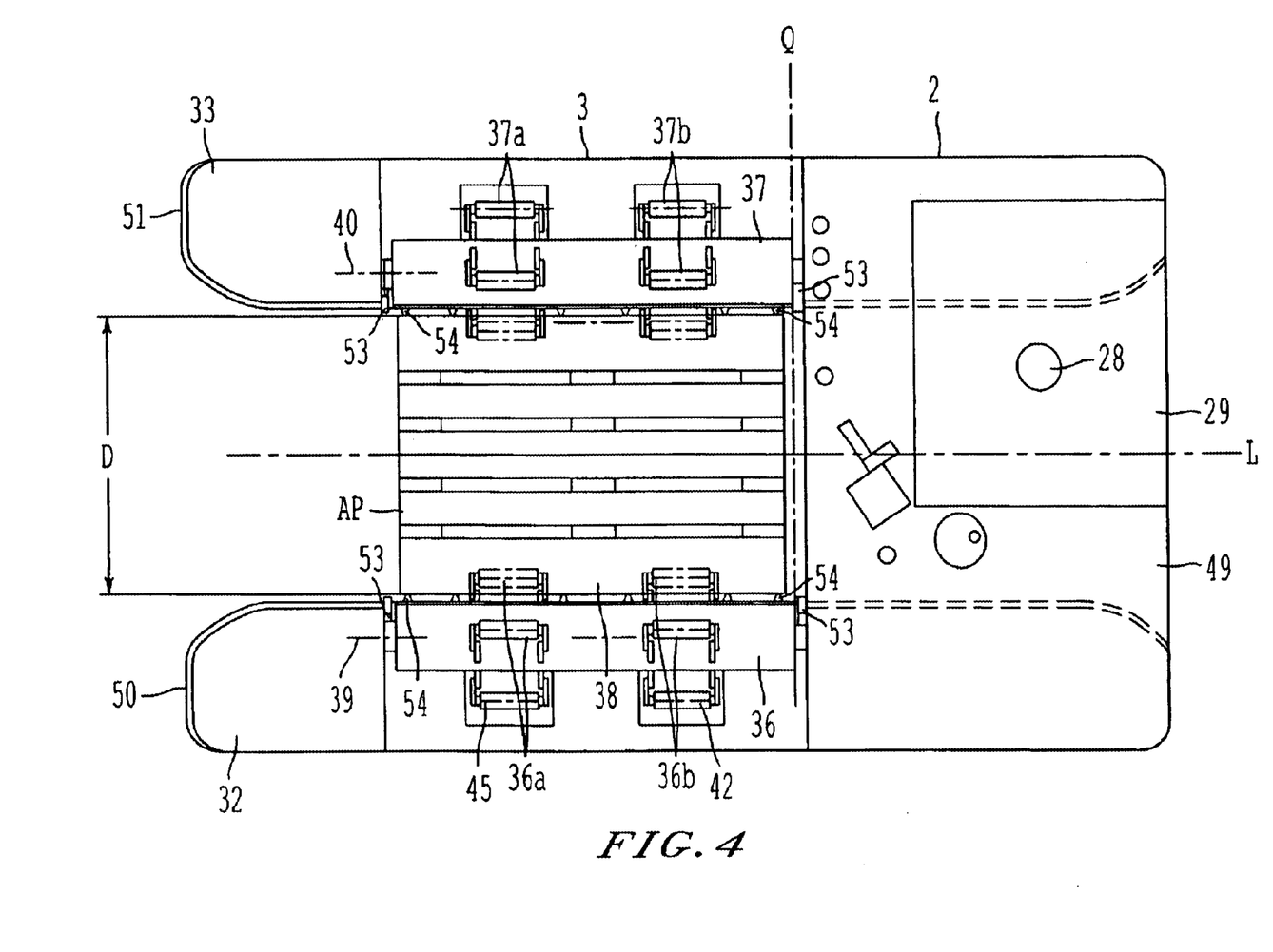
FIG. 4 shows a schematic top view of the preferred embodiment of the industrial truck according to the invention, where a holding basket that is arranged above the load arms is left out for the sake of simplicity.

The load part 3 comprises two wheel arms 32 and 33 that extend in the longitudinal direction, which support the load part 3 of the industrial truck 1 on the floor B with load rollers 34 and 35, respectively. As indicated in FIG. 4, the wheel arms 32 and 33, viewed in the crosswise direction Q of the industrial truck 1, are arranged at a distance D from one another, which is so great that a pallet 38 to be picked up, for example a so-called "euro-pallet" with a length of 1200 mm, a width of 800 mm, and a height of 150 mm, can be arranged between the wheel arms 32 and 33, i.e. between the load arms 36 and 37 described below.

Figure 2:
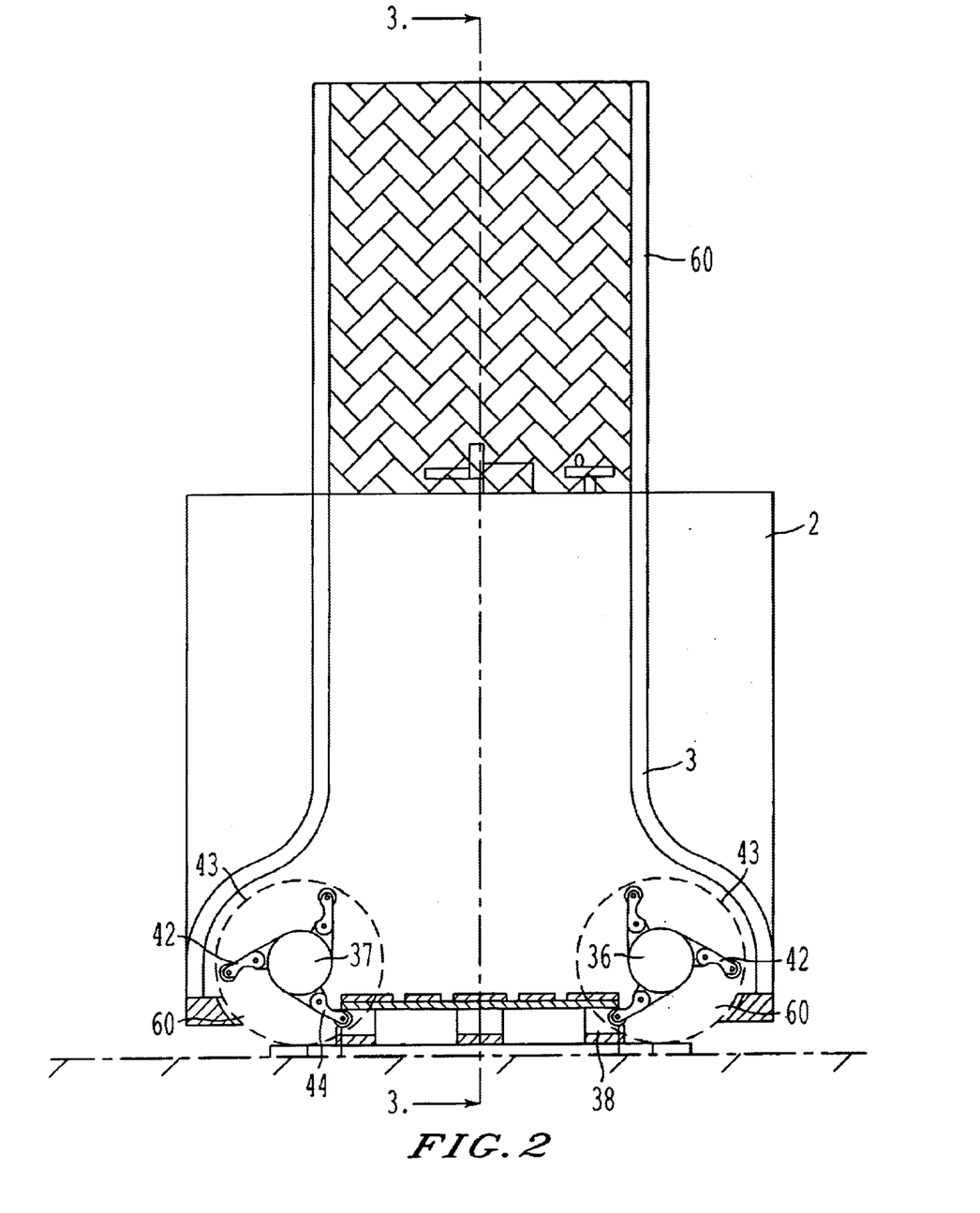
FIG. 2 shows a schematic cross-sectional view along line II—II in FIG. 1.
Figure 3:
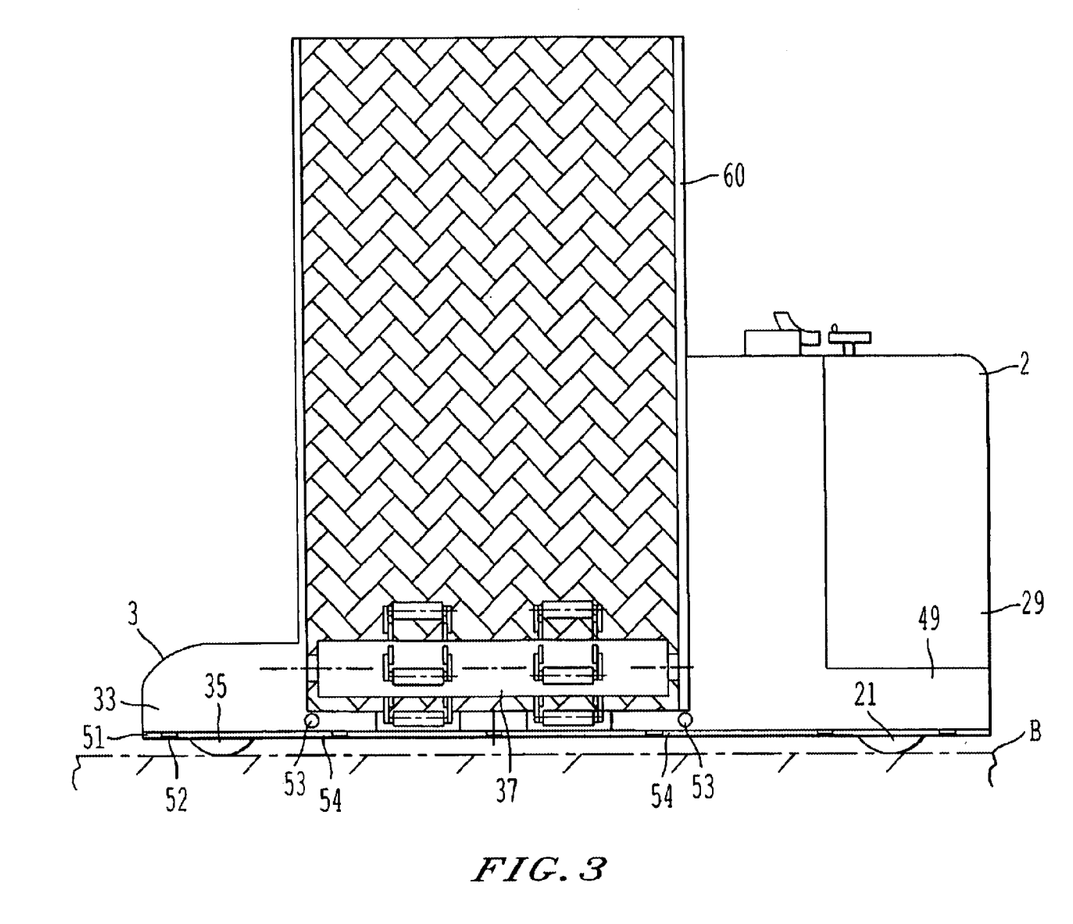
FIG. 3 shows a schematic cross-sectional view along line III—III in FIG. 2.

The load part 3 furthermore has the two load arms 36 and 37, which are supported on the drive part 2 or on the wheel arms 32 and 33, respectively, as is evident from FIG. 3, for example. The load arms 36 and 37 have the function of holding, that is grasping and in lifting or setting down a pallet 38 that is arranged between them, which, by the way, can be packed or empty. In the preferred embodiment, the load arms 36 and 37 are structured as rollers, in each instance, which are mounted to rotate around an axis of rotation 39 and 40, respectively, of the corresponding wheel arm 32 and 33, respectively, and the drive part 2, as is evident from FIGS. 2 and 4, for example. It is true that in the preferred embodiment, the axes of rotation 39 and 40 of the two rollers 36 and 37 are arranged to be stationary horizontally and vertically, but they can be adjusted, for example before the first start-up of the industrial truck, or within the framework of maintenance work.

Two groups 36a and 36b, and 37a and 37b, respectively, of wing-like coupled pallet holders 42 are provided on the rollers 36 and 37, respectively. The two pallet holder groups 36a and 36b, and 37a and 37b, respectively, are arranged spaced apart in the longitudinal direction, where the distance is adapted to the distance between the recesses (not shown) in pallet 38 that are provided to hold it.

Figure 5:
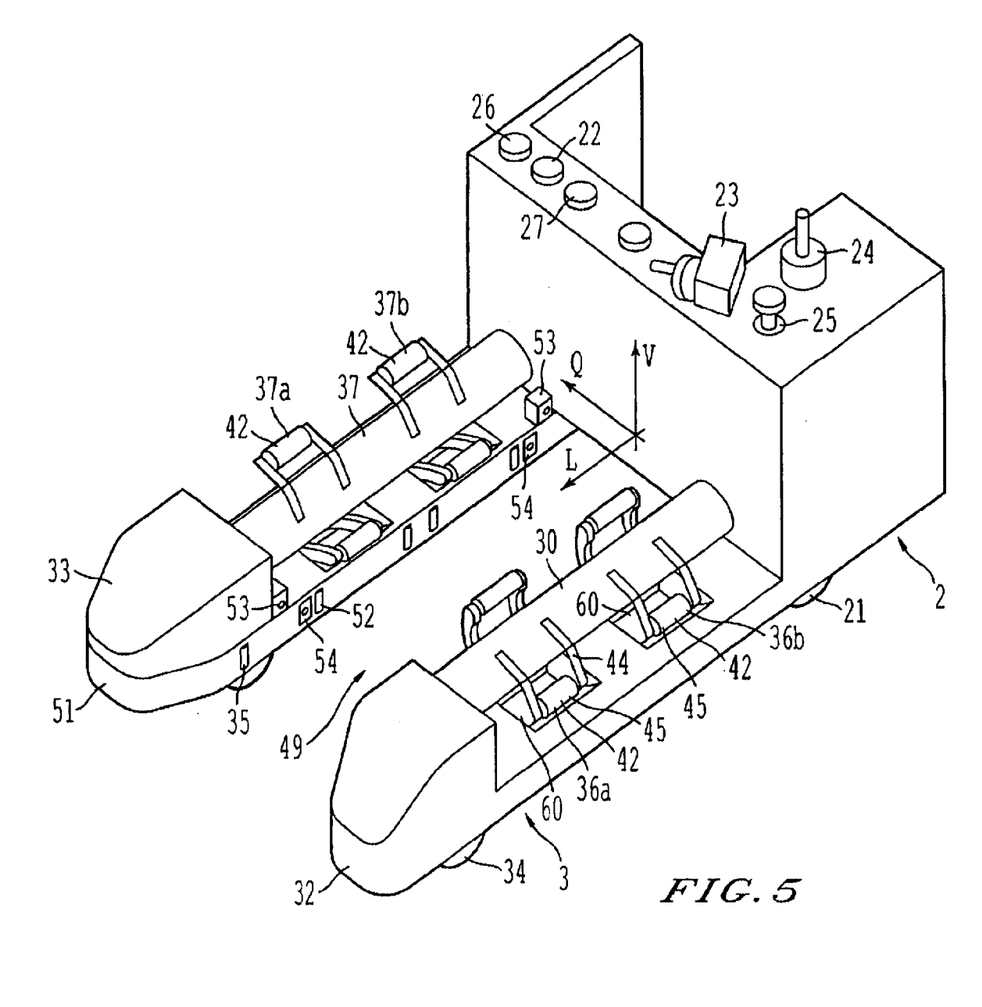
FIG. 5 shows a schematic perspective view of the preferred embodiment of the industrial truck according to the invention, where a holding basket that is arranged above the load arms is left out for the sake of simplicity.
Figure 6A:
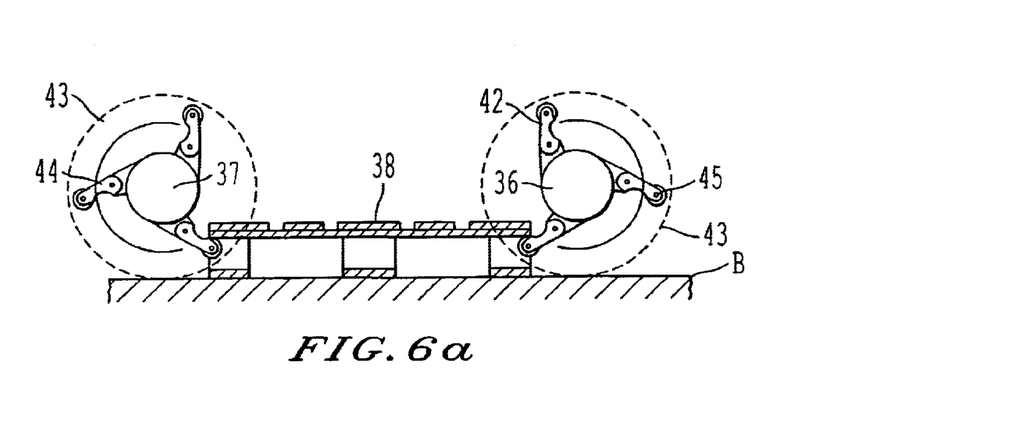
FIGS. 6a to 6d illustrate the method of operation of the industrial truck according to the invention in the formation of a pallet stack.

As is particularly evident from FIGS. 2, 5, and 6a, each pallet holder group 36a and 36b, and 37a and 37b, respectively, viewed in the circumference direction of the roller 32 or 33, respectively, each comprises three pallet holders 42 spaced uniformly apart, which are coupled with the corresponding roller 32 or 33, respectively, in wing-like manner, by means of a spring-biased hinge 44, specifically in such a manner that the pallet holders 42 tend to assume a tangential position, in which they extend essentially tangentially over the outside circumference of the corresponding roller 32 or 33. However, the pallet holders can be pivoted into a circumference position, counter to the bias force, in which they are aligned essentially in the circumference direction, as is evident, for example, from FIG. 6d.

The pallet holders 42 each have a contact roller 45 mounted at the end that enters into contact with the pallet 38, which rolls along the pallet 38 when the pallet holder 42 engages with it. In the preferred embodiment, the contact rollers 45 are each made from an elastic and therefore impact-absorbing material.

During a synchronous, opposite rotation of the rollers 36 and 37, the contact rollers 45 of the pallet holders 42 move in a circular path 43, in each instance. The distance between the axes of rotation 39 and 40 of the two rollers 36 and 37, respectively, as well as the diameter of the circular paths 43 are particularly set or predetermined in such a way that the pallet holders 42 engage in corresponding recesses of the pallet 38 that is arranged between the rollers 36 and 37, during their circular movement, and take the pallet 38 with them during further circular movement, and lift it to a certain height H, as is evident from FIGS. 6a to 6d. By means of a synchronous, opposite rotational movement of the two rollers 36 and 37, the pallet holders 42 are therefore in a position to pick up the pallet 38 and to lift it to a certain height simply by means of a further rotational movement. A further rotational movement of the load arms would then have the result that the pallet holders go out of engagement with the lifted pallet, which would cause the latter to fall to the floor. Therefore the rotational movement of the rollers 36 and 37 is stopped as soon as the pallet 38 has reached the predetermined height (corresponding to the pallet height including a safety gap of approximately 2 cm).

The wheel arms 32 and 33 of the industrial truck 1 are furthermore structured in such a way, in particular, that they allow an arrangement of the rollers 36 and 37, including the pallet holders 42, that unhindered rotational movement of the rollers 36 and 37, on the one hand, and unhindered circular movement of the contact rollers 45 of the pallet holders 42, on the other hand, is possible. For this purpose, recesses 60 are provided on the wheel arms 32 and 33, which can be seen in FIGS. 2 and 5, for example. Before start-up of the industrial truck, or within the framework of maintenance work, the rollers 36 and 37 are adjusted in such a way that the pallet holders 42 do not touch either the floor B or the wheel arms 32 and 33, during a rotational movement of the rollers 36 and 37 on the one hand, and can be brought into and out of engagement with the pallet 38 to be picked up, with a positive and/or a non-positive lock, on the other hand. In the preferred embodiment, the roller radius is approximately 18 cm, the radius of the circular path 43 of the contact rollers 45 of the pallet holders 42 is approximately 42 cm, and the floor clearance is approximately 2 cm.

The load part 3 of the industrial truck according to the invention furthermore comprises a feed device in the form of a guide channel 49 that extends over the load part 3 and the drive part 2 in the longitudinal direction, which is delimited in the lateral direction by two guide rails 50 and 51, each of which is assigned to one of the two wheel arms 32 and 33. The guide rails 50 and 51 guide an empty pallet that is lying on the floor, while it is "run over" or collected by the industrial truck, between the two rollers 36 and 37, so that these can pick up the pallet 38, as soon as the pallet 38 is located in a so-called holding position AP, viewed in the direction of travel, i.e. longitudinal direction L. Since the guide channel 49, including the guide rails 50 and 51, extends beyond the load part 3 and the drive part 2 of the industrial truck 1 according to the invention, a pallet 38 lying on the floor can be collected both during forward travel and during reverse travel of the industrial truck 1.

The guide rails 50 and 51 each have a plurality of guide rollers 52 spaced apart in the direction of travel, i.e. the longitudinal direction of the industrial truck 1, which are arranged to rotate around an axis of rotation that is aligned vertically. These guide rollers 52 have the function of minimizing the friction forces that occur when a pallet 38 that is lying on the floor is run over and collected, between the guide rails 50 and 51 of the feed device and the pallet 38.

In order to position the collected pallet 38 in the holding position AP indicated above, which is evident from FIG. 4, locking bolts 53 are furthermore provided in the guide channel 49, i.e. on the guide rails 50 and 51, which can be moved out horizontally, perpendicular to the direction of travel, i.e. the longitudinal direction L. The locking bolts 53 allow releasable locking of the pallet 38 to be picked up in the holding position AP between the two rollers 36 and 37. The industrial truck 1 therefore does not have to be stopped after a pallet 38 has been run over and collected, since the collected pallet 38 is held in place in the predetermined holding position AP, in which it can be held by the pallet holders 42. Instead, the pallet to be picked up is pushed along for a short distance in the direction of travel of the industrial truck 1, after it has assumed the predetermined holding position AP and before it is removed from the floor B. By suitably adjusting the speed of travel of the industrial truck to the speed at which the pallet 38 is picked up, in this case the distance over which the pallet 38 is pushed while lying on the floor can be minimized.

In addition to the locking bolts, holding position sensors 54, for example in the form of end position switches or sensors, are furthermore provided, which detect whether or not the pallet 38 has assumed the predetermined holding position AP and, if applicable, indicate this by issuing a corresponding electrical signal. As a function of the electrical signal, the operator of the industrial truck 1 can then recognize that the pallet 38 is in the holding position AP and can be picked up.

The drive part 2 of the industrial truck 1 furthermore comprises a control device (not shown), by means of which the rollers 36 and 37 can be activated. This control device is coupled to the holding position sensors 54 in this embodiment, and does not allow the pallet 38 to be picked up by means of the rollers 36 and 37 until after the electrical signal that indicates that the pallet 38 is in the holding position AP has been issued. The operator can select whether he/she will trigger activation of the rollers 36 and 37 himself/herself, or whether activation of the rollers 36 and 37 will take place automatically, as a function of the electrical signal of the holding position sensors.

In the region of the wheel arms 32 and 33, draw hooks 55 that can be moved out in the direction of travel, i.e. the longitudinal direction L, are furthermore provided, which serve to pull a pallet that is resting on its side against a wall, and actually cannot be collected by means of the industrial truck according to the invention, away from the wall, so that it becomes accessible for the industrial truck 1 according to the invention. In the retracted state, these draw hooks do not project, so that furthermore, a stack of pallets can also be pushed along ahead of the industrial truck, using the industrial truck.

Finally, there is a holding basket 60 above the load arms 36 and 37, which has the function of holding the collected and picked-up pallets, guided in the vertical direction, on the one hand, in order to prevent the stack of pallets that has been formed from the pallets that have been picked up from tipping over. On the other hand, the holding basket 60 also has the function of aligning the pallets that were picked up to form the pallet stack, one after the other, in such a way that a pallet stack with outside dimensions that lie within a certain tolerance range is formed. Furthermore, an adjustable end switch is attached to the holding basket 60, which indicates that a certain height, and therefore a certain number of stacked pallets, has been reached.

Making reference to FIGS. 6a to 6d, the operation and the method of functioning of the industrial truck according to the invention will be explained below. For this purpose, the formation of a pallet stack consisting of several pallets will be described.

The formation of a pallet stack using the industrial truck according to the invention can be implemented in that first, a single pallet 38 that is lying around on the floor B is run over, i.e. collected, where the collected pallet 38 is placed between the two wheel arms 32 and 33 and, in a defined position, between the two rollers 36 and 37, by means of the guide channel. When the holding position AP has been reached, the collected pallets are held in the holding position AP by means of the locking bolts 53, specifically even if the truck continues to move. The holding position AP of the pallets 38 is detected by the holding position sensor 54, whereupon the latter issues a corresponding signal.

As a function of the electrical signal of the holding position sensor, the rollers 36 and 37 are finally activated, either manually by the operator or automatically by the control device, causing the rollers 36 and 37 to be put into rotational motion in the direction of rotation indicated in FIG. 6a, in each instance, whereupon the pallet holders 42 each engage in the pallet 38.

Figure 6B:
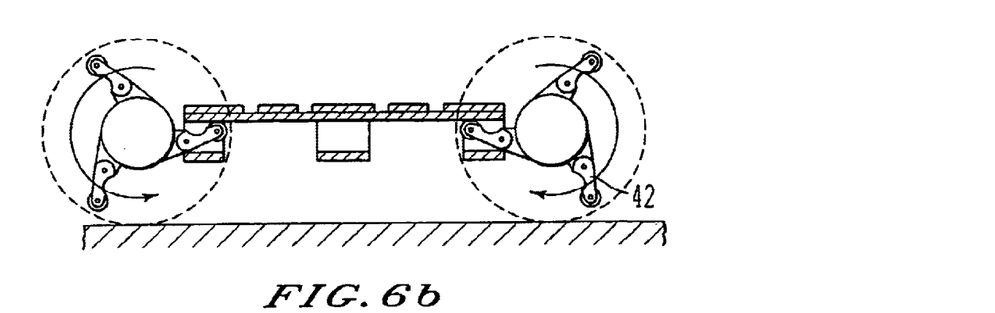

Over the course of the continued rotational movement, the pallet holders 42 take the pallet 38 along with them in an upward direction, as is illustrated in FIG. 6b.

Figure 6C:
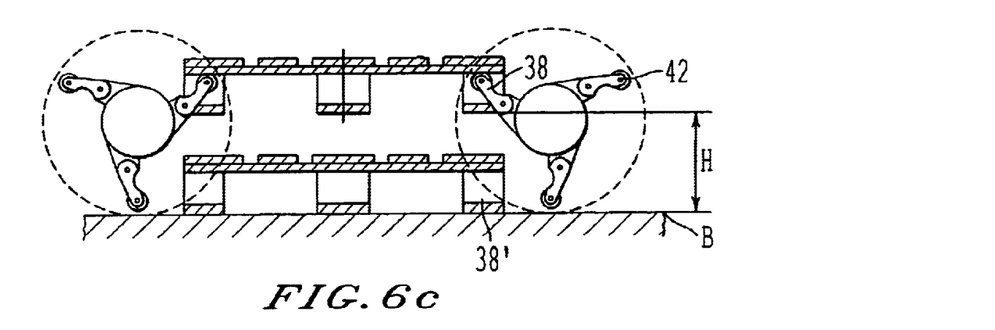

As soon as the pallet 38 has been lifted so high that sufficient room for another pallet 38' is available under the raised pallet 38, the rotational movement of the rollers 36 and 37 is stopped, causing the pallet 38 to be held at the defined height H, for the time being. This is shown in FIG. 6c.

In this condition, the next pallet 38' can be run over and collected. After it has been detected again that the collected pallet 38' has assumed the holding position AP, the rollers 36 and 37 are again put into rotational motion, but in the opposite direction of rotation, as is evident from FIG. 6d, causing the pallet holders 42 to move downward and to set the first pallet 38 down on the pallet 38'.

Figure 6D:
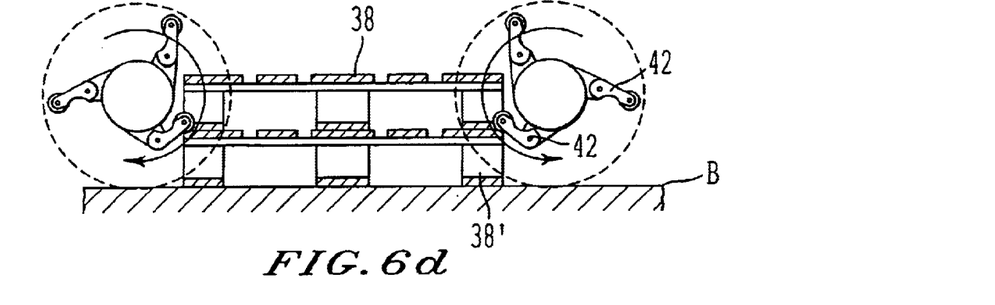

If the rotational movement of the rollers 36 and 37 continues downward, the pallet holders 42' bump up against a bottom base board of the first pallet 38 from the top, and pivot into the circumference position in which the pallet holders 42' are aligned essentially in the circumference direction of the roller 36 or 37, respectively, counter to the spring bias force, because they are coupled to the roller 36 or 37, respectively, in wing-like manner, as is evident from FIG. 6d. In this embodiment, the pallet holders 42 therefore pivot towards the roller 36 or 37, respectively, in each instance, in order to be able to glide from the pallet 38 in the higher position into the pallet 38' in the lower position. Because of the contact roller, the pallet holders 42' roll along the two pallets 38 and 38' as this happens. As mentioned above, the pivoting movement that is required for this purpose is made possible by the wing-like coupling of the pallet holders 42 to the rollers 36 and 37, in each instance.

After engagement of the pallet holders 42 in the pallet 38', the direction of rotation of the rollers is reversed again, causing the pallet holders 42 to lift the pallet stack, which in the meantime consists of the pallets 38 and 38', as shown in FIG. 6a.

The steps described above are now repeated as often as necessary, until the pallet stack has reached a certain height, which is detected by the end switch provided on the holding basket. Then automatic or manual activation of the rollers is terminated. Using the industrial truck according to the invention, the pallet stack can now be transported to a desired location, and be set down at this location by pushing a button.

The formation of a pallet stack, i.e. carrying out the steps described above, aside from steering the industrial truck, can be carried out either automatically or manually, i.e. by activation of various function switches by the operator of the industrial truck. Collection and pick-up of the pallets can take place in the forward or reverse direction of travel, because the guide channel extends through the load part and the drive part. Therefore, in the preferred embodiment, locking bolts and holding position sensors are provided for this purpose, both ahead of and behind the holding position that is predetermined by the arrangement of the pallet holders, viewed in the direction of travel, i.e. the longitudinal direction of the industrial truck. However, picking up pallets during forward travel of the industrial truck only makes sense up to eye level, since after that, the pallet stack blocks the operator's view.

Making reference to FIGS. 7a to 7d, unstacking of an existing pallet stack will now be explained, which fundamentally takes place in the reverse order as formation of a pallet stack.

Figure 7A:
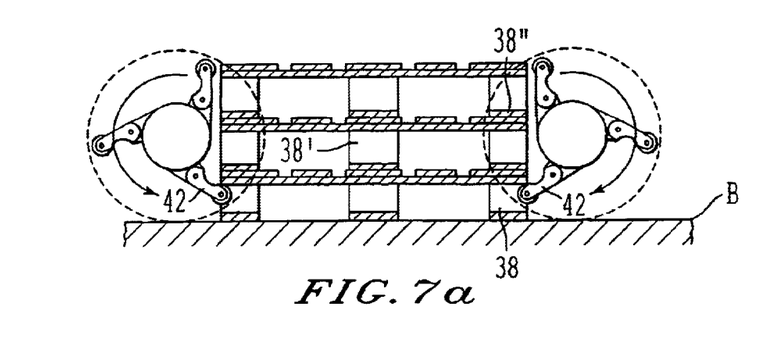
FIGS. 7a to 7d illustrate the method of operation of the industrial truck according to the invention in the unstacking of an existing pallet stack.

First, the industrial truck according to the invention picks up an existing pallet stack of empty pallets 38, 38', 38", etc., by taking the pallet stack between the wheel arms and the rollers, and, by means of appropriate activation of the two rollers, lifts the pallet stack to such a height, via the bottom-most pallet 38, that transport of the pallet stack is possible without floor contact, as is evident from FIG. 72.

Figure 7B:
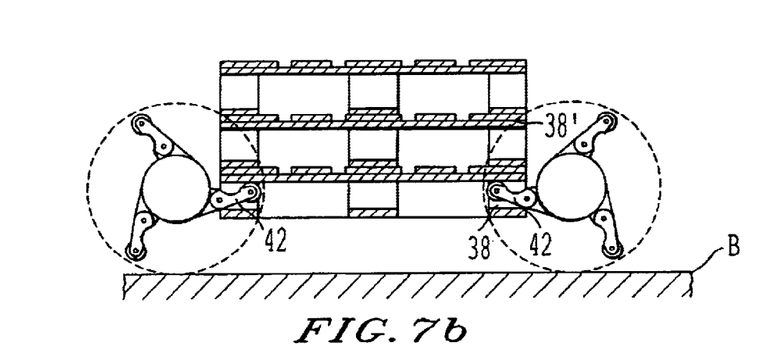

In this state, the pallet stack is transported to the desired location, at which the bottom-most pallet 38 is to be set down, with the pallet stack being held at the previously assumed height during transport. This is illustrated in FIG. 7b.

Figure 7C:
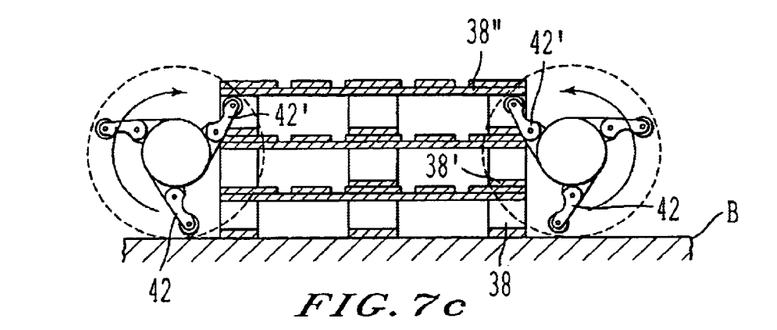

At the desired location, a rotational movement of the two rollers downward takes place by means of manual activation of the two rollers by the operator, as shown in FIG. 7c, causing the pallet stack to be set down on the floor B and the pallet holders 42, which until then have been engaged with the bottom-most pallet 38, to slide out of the corresponding recesses. This rotational movement is continued until the next pallet holders 42', viewed in the circumference direction and direction of rotation of the rollers, in each instance, engage in the corresponding recesses of the pallet 38' that is second in line, after having rolled along the pallet 38" that is third in line, performing a pivoting movement towards the circumference position, in each instance, as is evident from FIG. 7c.

Figure 7D:
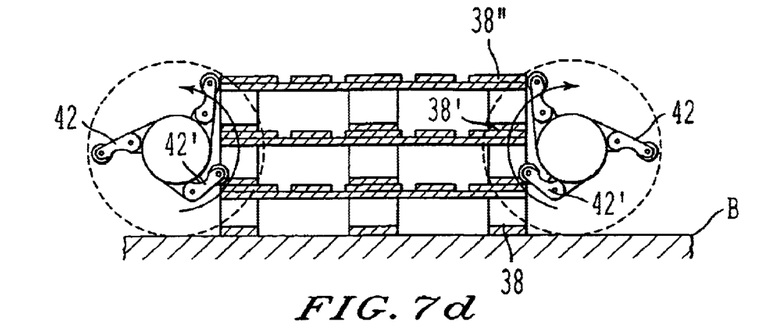

Subsequently, the rollers are put into rotational motion in the opposite direction of rotation, as is shown in FIG. 7d, causing the pallet holders 42' to now lift the pallet stack, starting from the second pallet 38', specifically so far until the bottom-most pallet 38 is released.

Subsequently, the industrial truck, with the pallet stack that has been reduced by the bottom-most pallet, can be moved to a different location, in order to repeat the steps indicated above. This can be continued until the pallet stack has been completely unstacked.

In the following, possible variations of the preferred embodiment and additional embodiments of the industrial truck according to the invention will be explained.

In the embodiment described above, picking up the pallets is done in that the pallet holders move in a circular path, in each instance, by means of a rotation of the rollers. Lifting of the pallets therefore takes place by means of a horizontal movement component and a vertical movement component of the pallet holders. Once the pallet holders have been brought into engagement with the pallet, however, it would also be possible to lift the pallet in that the rollers are raised vertically, instead of a further rotational movement of the rollers. Likewise, lifting of the pallet could be achieved by means of a combination of the rotational and vertical movement of the rollers. Movement of the pallet holders perpendicular to the longitudinal direction could take place by means of an exclusive movement of the load arms. However, a movement of the pallet holders provided on the load arms, or a combined movement of the load arms and the pallet holders is also possible.

In the preferred embodiment, the pallet holders are each coupled with the roller, in each instance, in wing-like manner. However, this is not absolutely necessary. The pallet holders can also be rigidly attached to the roller, in each instance, where in this case the pivoting movement of the pallet holders towards the roller, in each instance, which is necessary in the preferred embodiment, can be circumvented in that the rollers, in each instance, are moved away from the pallet, horizontally, perpendicular to the longitudinal direction of the industrial truck.

Instead of the load arms that are structured as rollers, in accordance with the preferred embodiment, the load arms can comprise a plurality of transport devices that are aligned vertically and spaced apart in the longitudinal direction, with a transport means, such as a conveyor belt or a conveyor chain. In this case, the pallet holders, in each instance, would be provided on the transport means, in each instance. The transport means could be driven synchronously, in opposite directions. As in the preferred embodiment, the transport means could have a plurality of pallet holders spaced uniformly apart in the running direction. Likewise, pallet holders could be coupled with the transport means, in each instance, in wing-like manner, by means of a spring-biased hinge, in such a way that they assume a normal position under the effect of the spring bias, in which they are normally aligned with the transport means, in each instance, and can be pivoted into a parallel position, counter to the bias force, in which they are aligned essentially parallel to the transport means.

In another variation of the preferred embodiment, the lead arms could be provided on a vertically movable load carriage, which can be moved up and down along a lift mast assigned to the load part, as in the case of a counterweight stacker, a wheel-supported stacker, or a reach mast truck, where the load arms in turn can be adjustable horizontally, perpendicular to the direction of travel, i.e. the longitudinal direction of the industrial truck. The pallet holders can therefore also be structured as prong elements aligned towards the pallet to be picked up, which can be brought into engagement with the corresponding recesses of the pallet to be picked up, by means of horizontal and vertical movements, perpendicular to the direction of travel, i.e. the longitudinal direction of the industrial truck, in each instance.

If the load arms are carried by a vertically movable load carriage, it is possible, in contrast to the preferred embodiment, to unstack an existing pallet stack not pallet-by-pallet but also in batches. Furthermore, it would also be possible, in this case, to lift a pallet or a pallet stack onto a transport truck or a ramp, or down from a transport truck or a ramp.

Furthermore, it would be possible to have the load arms and/or the pallet holders perform an appropriate kinematic movement, for example in the form of cams and cam followers, as a function of the pallet or the palleted load to be picked up in each instance, as well as taking into consideration the prevailing ambient conditions of the pallet holders, in each instance, including the available space.

The wheel arms could circumvent the load arms laterally, in each instance, viewed in the crosswise direction, or could bridge them in yoke-like manner, viewed in the vertical direction.

In an advantageous further development, the holding basket comprises a locking device, for example one or more spring-biased pivot hooks, which allow(s) releasable locking of the empty pallet(s) held in the holding basket, at a certain height. This further development facilitates both the formation and the unstacking of a pallet stack, since it creates the possibility of holding the pallet stack in place, starting from a desired pallet, for example the second pallet from the bottom, using the locking device, while the bottom-most pallet can be put down on the floor by way of engagement of the pallet holders and the corresponding activation of the load arms. Subsequently, the pallet stack being held in place by the locking device can be taken over by the load arms again, and the procedure described above can be initiated again.

The industrial truck according to the invention can be implemented as a stand-alone device or in the form of a special attachment device for a wheel-supported stacker, a counterweight stacker, or a reach mast truck.

Although the industrial truck according to the invention is specifically designed for handling empty pallets of a certain format, particularly so-called euro-pallets, it can fundamentally also be used for transport of a pallet, a palleted load, or a pallet stack.

Commercial Usefulness

The industrial truck according to the invention is particularly well suited for handling empty pallets, for example in the commissioning sector and the transport of piece goods. Use of the stacker ant appears practical starting from a certain daily number of empty pallets that can no longer reasonably be handled manually. The stacker ant is suitable as a means of transport of packed pallets. Significant advantages in connection with this activity occur in the transport of special pallets.

What is claimed is:

1. An industrial truck comprising:
    a drive part configured to drive the industrial truck; and
    a load part configured to collect and stack pallets to a stack of pallets and to remove a pallet from the stack of pallets, the load part comprising
        two load arms extending in a first direction of travel of the industrial truck, where functions in connection with handling of a pallet are exclusively performed by the load arms, wherein the load arms, viewed in the first direction are provided on opposite sides of the pallet to be picked up and have each a plurality of pallet holders spaced apart in the first direction, which are configured to rotate one of clockwise and counter-clockwise to grip and capture a pallet perpendicular to the first direction and to rotate in the other one of counter-clockwise and clockwise to release the captured pallet.

2. The industrial truck according to claim 1, wherein the pallet holders are configured to be brought into engagement with the pallet to form a positive lock.

3. The industrial truck according to claim 1, wherein the load arms are configured to be horizontally and vertically adjustable perpendicular to a direction of travel of the industrial truck.

4. The industrial truck according to claim 1, wherein the load part comprises a vertically adjustable load carriage configured to carry the load arms.

5. The industrial truck according to claim 1, wherein an the pallet holders comprise a rotation-mounted contact roller configured to roll on the pallet during an engagement therewith.

6. The industrial truck according to claim 5, wherein outer surface of the contact roller comprises an elastic material.

7. The industrial truck according to claim 1, further comprising:
    a feed device configured to guide the pallet to a position between the load arms.

8. The industrial truck according to claim 7, wherein the feed device comprises a guide channel that extends beyond the load part and the drive part of the industrial truck, the guide channel configured to be adjusted to a format of the pallet and to collect the pallet during at least one of a forward or a reverse travel of the industrial truck.

9. The industrial truck according to claim 8, wherein the guide channel is delimited by guide rails configured to be disposed at a side of the pallet, a distance between the guide rails being a maximum at one of a front and a rear of the industrial truck.

10. The industrial truck according to claim 9, wherein the plurality of pallet holders comprises a plurality of guide rollers, the plurality of guide rollers disposed on the guide rails and spaced apart in the first direction.

11. The industrial truck according to claim 7, wherein the feed device comprises a locking device configured to releasably lock the pallet in a predetermined holding position.

12. The industrial truck according to claim 11, further comprising:
    a holding position sensor configured to detect whether the pallet is locked in the predetermined holding position and to output a corresponding electrical signal.

13. The industrial truck according to claim 12, further comprising:
    control device coupled with the holding position sensor, the control device configured to activate at least one of the load arms and the pallet holders in response to the electrical signal to add the pallet to the stack of pallets.

14. The industrial truck according to claim 13, wherein the control device is configured to activate the at least one of the load arms and the pallet holders in response to the electrical signal to add the pallet to the stack of pallets.

15. The industrial truck according to claim 1, wherein the load arms comprise a rotation-mounted roller to which the pallet holders are attached.

16. The industrial truck according to claim 15, wherein the plurality of pallet holders is disposed on the rollers and spaced uniformly apart in a circumference direction.

17. The industrial truck according to claim 15, wherein at least one of the pallet holders is coupled with the roller in a wing-like manner such the pallet holder is configured to extend tangentially over an outside circumference of the roller under effect of a bias force, and is configured to be pivoted into a position counter to the bias force.

18. The industrial truck according to claim 1, further comprising:
    a holding device disposed above the load arms and configured to hold the stack of pallets stacked in a vertical direction.

19. The industrial truck according to claim 18, further comprising:
    a locking device configured to release locking of the pallet held in the holding device.

* * * * *